(12) United States Patent
Ghesu et al.

(10) Patent No.: US 11,275,976 B2
(45) Date of Patent: Mar. 15, 2022

(54) MEDICAL IMAGE ASSESSMENT WITH CLASSIFICATION UNCERTAINTY

(71) Applicant: Siemens Healthcare GmbH, Erlangen (DE)

(72) Inventors: Florin-Cristian Ghesu, Lawrence Township, NJ (US); Eli Gibson, Plainsboro, NJ (US); Bogdan Georgescu, Plainsboro, NJ (US); Sasa Grbic, Plainsboro, NJ (US); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 89 days.

(21) Appl. No.: 16/561,246

(22) Filed: Sep. 5, 2019

(65) Prior Publication Data

US 2020/0320354 A1 Oct. 8, 2020

Related U.S. Application Data

(60) Provisional application No. 62/829,910, filed on Apr. 5, 2019.

(51) Int. Cl.
*G06K 9/62* (2006.01)
*G06T 7/00* (2017.01)

(52) U.S. Cl.
CPC ......... *G06K 9/6284* (2013.01); *G06K 9/6259* (2013.01); *G06K 9/6262* (2013.01); *G06K 9/6277* (2013.01); *G06T 7/0012* (2013.01); *G06K 2209/05* (2013.01); *G06T 2207/10116* (2013.01); *G06T 2207/20081* (2013.01); *G06T 2207/30096* (2013.01)

(58) Field of Classification Search
CPC .. G06K 9/6284; G06K 9/6259; G06K 9/6262; G06K 9/6277; G06K 9/6278; G06K 9/628; G06K 9/6279; G06K 2209/05; G06T 7/0012; G06T 2207/10116; G06T 2207/20081; G06T 2207/30096; G06N 20/20; G06N 7/005
See application file for complete search history.

(56) References Cited

U.S. PATENT DOCUMENTS

| 7,747,551 B2* | 6/2010 | Snyder | G06N 20/00 706/20 |
| 2018/0247107 A1* | 8/2018 | Murthy | G06K 9/4628 |
| 2020/0161005 A1* | 5/2020 | Lyman | G06T 11/001 |

(Continued)

OTHER PUBLICATIONS

Dempster, A.P., A generalization of bayesian inference, Harvard University, Department of Statistics, 1968; 80 pp.

(Continued)

*Primary Examiner* — Vu Le
*Assistant Examiner* — Julius Chai

(57) ABSTRACT

Medical images may be classified by receiving a first medical image. The medical image may be applied to a machine learned classifier. The machine learned classifier may be trained on second medical images. A label of the medical image and a measure of uncertainty may be generated. The measure of uncertainty may be compared to a threshold. The first medical image and the label may be output when the measure of uncertainty is within the threshold.

18 Claims, 9 Drawing Sheets

(56) References Cited

U.S. PATENT DOCUMENTS

| | | | |
|---|---|---|---|
| 2020/0175677 A1* | 6/2020 | Mavroeidis | G06T 7/0012 |
| 2020/0275857 A1* | 9/2020 | Lou | G01R 33/46 |
| 2020/0357118 A1* | 11/2020 | Yao | G06T 7/187 |

OTHER PUBLICATIONS

Gohagan, J.K. et al., The prostate, lung, colorectal and ovarian (PLCO) cancer screening trial of the National Cancer Institute: History, organization, and status, National Cancer Institute, Division of Cancer Prevention; 2000, 22 pp.

Guan, Q. et al., Diagnose like a radiologist: Attention guided convolutional neural network for thorax disease classication, arXiv 1801.09927; Jan. 30, 2018; 8 pp.

Guendel, S. et al., Learning to recognize abnormalities in chest X-rays with location-aware dense networks, arXiv 1803.04565; Mar. 12, 2018; 9 pp.

Huang, G. et al., Densely connected convolutional networks, arXiv: 1608.06993; Jan. 28, 2018; 9 pp.

Josang, A., Subjective Logic: A Formalism for Reasoning Under Uncertainty, Springer, 2012; 69 pp.

Lakshminarayanan, B. et al., Simple and scalable predictive uncertainty estimation using deep ensembles, 31st Conference on Neural Information Processing Systems (NIPS 2017), 12 pp.

Molchanov, D., Variational dropout sparsities deep neural networks, arXiv: 1701.05369v3; Jun. 13, 2017; 10 pp.

Rajpurkar, P. et al., Deep learning for chest radiograph diagnosis: A retrospective comparison of the CheXNeXt algorithm to practicing radiologists, PLOS Medicine; https://doi.org/10.1371/journal.pmed.1002686; Nov. 20, 2018; 17 pp.

Sensoy, M. et al., Evidential deep learning to quantify classification uncertainty, 32nd Conference on Neural Information Processing Systems, NeurIPS 2018; 11 pp.

Srivastava, N., Dropout: a simple way to prevent neural networks from overfitting, Journal of Machine Learning Research 15 (2014) 1929-1958.

Wang, X. et al., ChestX-ray8: Hospital-scale Chest X-ray Database and Benchmarks on Weakly-Supervised Classification and Localization of Common Thorax Diseases, arXiv:1705.02315v5; Dec. 14, 2017; 19 pp.

Yao, L. et al., Weakly Supervised Medical Diagnosis and Localization from Multiple Resolutions, arXiv:1803.07703v1; Mar. 21, 2018; 17 pp.

\* cited by examiner

MEDICAL IMAGE ASSESSMENT WITH CLASSIFICATION UNCERTAINTY

PRIORITY CLAIM

This application claims priority to U.S. provisional application Ser. No. 62/829,910, filed 5 Apr. 2019, which is entirely incorporated by reference.

FIELD

The following disclosure relates to assessing medical images using a classification uncertainty.

BACKGROUND

Medical images may be reviewed as part of diagnosing illnesses. For example, the interpretation of chest radiographs is an essential task for the detection of thoracic diseases and abnormalities. However, the conclusion drawn from the medical image may differ depending on the person reviewing the medical image. Further, some images may be ambiguous and not clearly show healthy or abnormal anatomy. For example, the image quality may be low. Still further, the ways that a disease may present in a medical image is not standardized and is often subjective. The result is that interpreting the medical images accurately, consistently, and in a timely manner is a challenging task. These challenges apply whether a human or a machine is analyzing and classifying the images as healthy or abnormal.

SUMMARY

By way of introduction, the preferred embodiments described below include methods, systems, instructions, and computer readable media for assessing medical images using a classification uncertainty.

In a first aspect, a method for classifying medical images is provided. A first medical image is received. The first medical image is applied to a machine learned classifier. The machine learned classifier is trained on second medical images. A label of the medical image and a measure of uncertainty are generated based on the applying. The measure of uncertainty is compared to a threshold level of uncertainty. The first medical image, the label, or the first medical image and the label are output when the measure of uncertainty is within the threshold.

In a second aspect, a method for training a machine learning classifier is provided. Medical image data is received. A plurality of labels associated with the medical image data is stored. The machine learning classifier is trained with machine learning based on the medical image data and the plurality of classifications. A result of the training is a machine-learned classifier and an output of the machine-learned classifier is a label and a measure of uncertainty. The machine-learned classifier is stored.

In a third aspect, an image classification system is provided. An image processor is coupled with a memory. The memory contains instructions that, when executed, cause the image processor to receive a first image, apply the image to a machine learned classifier, the machine learned classifier trained on second images annotated with first labels, generate a second label based on the applying, generate a measure of uncertainty of the label based on the applying, and output the second label, the measure of uncertainty, or the second label and the measure of uncertainty.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Figure 1:
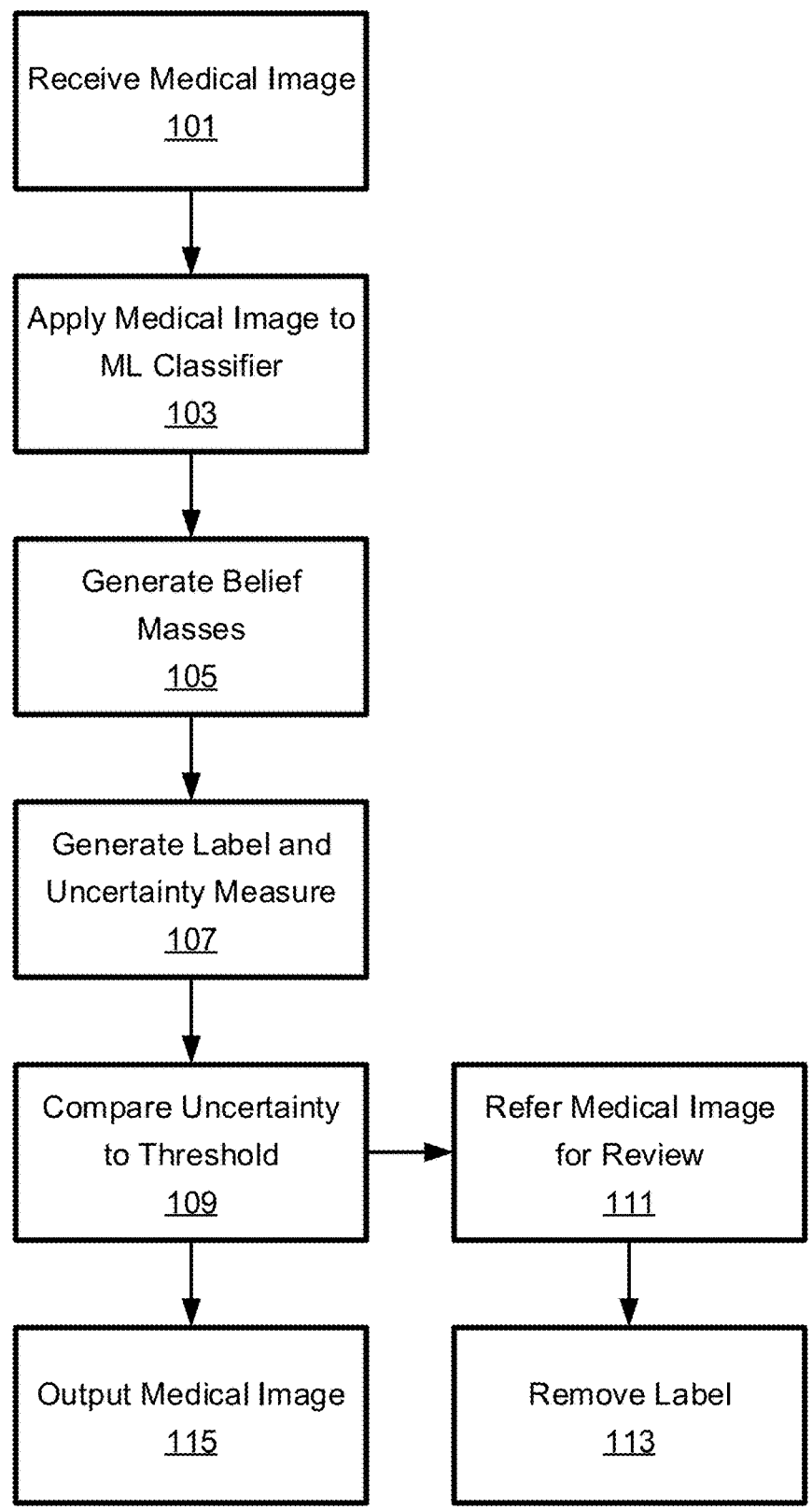
FIG. 1 illustrates an embodiment of a method classifying medical images.

In light of the difficulty of classifying images with human raters, deep learning models may be trained to classify medical images. However, such deep learning models may have poor classification performance on medical images outside of a training dataset used to train the deep learning model. For example, current deep learning solutions for chest radiograph abnormality classification may be limited to providing probabilistic predictions, relying on the capacity of a learning model to adapt to the high degree of label noise and become robust to the enumerated causal factors. In practice, however, this leads to overconfident systems with poor generalization on unseen data.

To overcome the problems of deep learning networks that generate probabilistic classification estimates, a deep learning network may be adapted to output a measure of uncertainty that captures the confidence of the network in the predicted classification. During training of such a deep learning network, the network learns not only the probabilistic estimate on the presence or absence of an abnormality in the medical image (e.g. abnormal anatomy), but also the classification uncertainty as an orthogonal measure to the predicted output. The machine learning network learns to identify evidence in the medical image for the labels in the form of belief masses, and the probability and uncertainty may be determined from the belief masses. In this way, with both the probability and uncertainty of the predicted classification, the deep learning network may account for the inherent variability and ambiguity of the medical images.

Probability and uncertainty give different information about the label being applied to the medical image. The probability or probabilistic estimate of the anomaly gives information about, based on the evidence in the image, does this image more likely belong in one category or another. For example, does the image more likely show normal anatomy or abnormal anatomy. The measure of uncertainty provides information about whether or not that label is correct. For example, though an image may be more likely to show normal anatomy, how likely is that label to be the correct label.

Using the measure of uncertainty, the deep learning network may be able to classify just the medical images with which the deep learning network has high accuracy in classification and refer the medical images having a high level of classification uncertainty for additional review. For example, medical images with high uncertainty may be interpreted by an experienced radiologist whereas medical images with low uncertainty may be interpreted by the deep learning network or less skilled interpreters.

Further, the measure of uncertainty may be used to improve the quality of training datasets. Large sets of medical images annotated with classification labels are available for training machine learning networks. For example, the prostate, lung, colorectal and ovarian (PLCO) cancer screening trial and open-access ChestX-Ray8 datasets contain chest radiographs with binary labels on the presence of different radiological findings. Though the images and labels are often reviewed by professional interpreters, not all the labels are correct. Machine learning labels trained on the incorrect labels are less reliable and less efficient as a result. However, a trained deep learning network may classify the medical images and give each image a corresponding uncertainty of the classification. A subset of the most uncertain images in the training set may be reviewed again. Because the training datasets may have tens of thousands of images, it may be difficult or time-consuming to review every image in the dataset for accuracy. However, if just a subset of the most uncertain images is reviewed, the quality and accuracy of the training data may be improved more quickly and using fewer resources. Higher quality training data results in more accurate and efficient machine learning networks when trained using the training data. Such deep learning networks may learn the dataset faster and have higher final performance when processing (e.g. classifying) image data.

FIG. 1 illustrates an embodiment of a method classifying medical images. More, fewer, or different acts may be performed. In some cases, acts 111, 113, or 115 may be omitted. The acts may be performed in a different order than shown. In some cases, act 113 may proceed directly from act 109. In some other cases, act 115 may proceed from act 113 or act 111. A processor coupled to a memory may be configured to perform one or more of the acts. For example, the processor 903 of FIG. 9 may be configured to perform one or more of the acts of FIG. 1.

In act 101, a medical image is received. The medical image may be generated by a medical imager. For example, the medical imaging device 909 of FIG. 9 may generate the medical image. The image may be received directly from the medical imager or through one or more intermediaries. In some cases, the medical image is received from the medical imager or a computer over a network. In some other cases, the medical image is stored and later received. For example, a server may store medical images and send or load the medical images for classifying.

The medical image may be an x-ray image, a computed tomograph (CT) image, a magnetic resonance (MR) image, or another image. The medical image may depict anatomy. For example, the medical image may depict a torso, head, or other portion of anatomy. In some cases, the medical image may be part of a training dataset of medical images. For example, the training dataset may be reviewed to determine a subset of images (e.g. those with high uncertainty) to be manually reviewed.

In act 103, the medical image is applied to a machine learned classifier. The machine learned classifier may be trained on another set of medical images. The other medical images may be referred to as a training set of images. For example, the machine learned classifier may be trained according to the method of FIG. 3, described below.

In act 105, one or more belief masses are generated. The belief masses may be an output of the machine learned classifier. The belief masses represent evidence in the medical image for the classification label. The evidence may be derived from features in the medical image. For example, numerous or strong features present in the medical image that indicate the presence of an abnormality means that more evidence is present for the abnormality, and few or weak features in the medical image indicating the presence of an abnormality means that less evidence is present for the abnormality. Likewise, numerous or strong features present in the medical image that indicate the presence of normal or healthy anatomy means that more evidence is present for the normal anatomy, and few or weak features in the medical image indicating the presence of normal anatomy means that less evidence is present for the normal anatomy. In some cases, where a binary label is used (such as the presence or absence of an anatomical anomaly in the medical image), belief masses may be formed for each label. From the belief masses, an uncertainty mass may be determined, as represented by:

$$u = 1 - b^+ - b^-, \quad \text{Eqn. 1}$$

$$\text{where} \quad b^+ = \frac{e^+}{E}, \quad \text{Eqn. 2}$$

$$b^- = \frac{e^-}{E}, \quad \text{Eqn. 3}$$

$$e^+; e^- \geq 0, \text{ and} \quad \text{Eqn. 4}$$

$$E = e^+ + e^- + 2, \quad \text{Eqn. 5}$$

In Equations 1-5, u represents the uncertainty (also known as a measure of uncertainty), $b^+$ represents the belief mass for the positive label (e.g. presence of anomaly), and $b^-$ represents the belief mass for the negative label (e.g. absence of anomaly). The belief masses may be defined as the evidence for a label ($e^+$ for the positive label and $e^-$ for the negative label) divided by the total amount of evidence, E, collected in the image. In this way, the belief masses are a measure of the probability of a label being correct for an input image. From the belief masses, the probability and uncertainty of the classification labels of the medical image may be determined. Though examples are given using binary labels, higher order labels with a greater number of belief masses may be used. Other methods may be used to determine the uncertainty. For example, stochastic processes, deep ensembles, or other techniques may be used to determine the uncertainty of the label.

The distribution of the evidence values in the binary label example may be modeled using a beta distribution defined by two parameters, as represented by:

$$f(x; \alpha, \beta) = \frac{\Gamma(\alpha+\beta)}{\Gamma(\alpha)\Gamma(\beta)} x^{\alpha-1}(1-x)^{\beta-1}, \quad \text{Eqn. 6}$$

where
$$\alpha; \beta \geq 1, \quad \text{Eqn. 7}$$
$$\alpha = e^+ + 1 \quad \text{Eqn. 8}$$
$$\beta = e^- + 1 \quad \text{Eqn. 9}$$

In Equations 6-9, $\Gamma$ denotes a gamma function, $\alpha$ is based on the evidence for the positive label, $\beta$ is based on the evidence for the negative label, and x is the predicted probability. The predicted probability, x, may also be expressed as $p_k$. For higher order classifications (e.g. more than two labels), other distribution functions may be used. For example, a Dirichlet distribution or another distribution may be used.

Figure 2A:
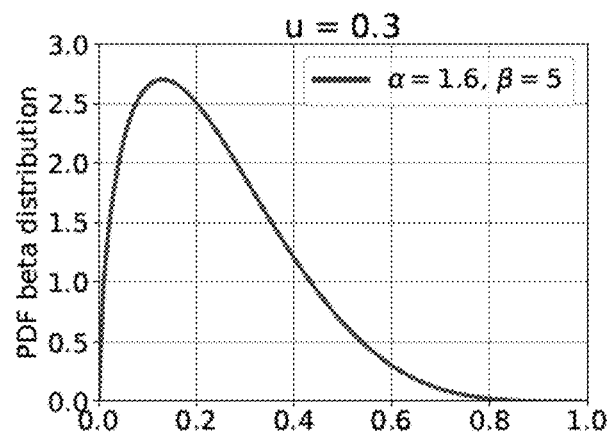
FIGS. 2a, 2b, and 2c illustrate probability density functions of binary labels.
Figure 2B:
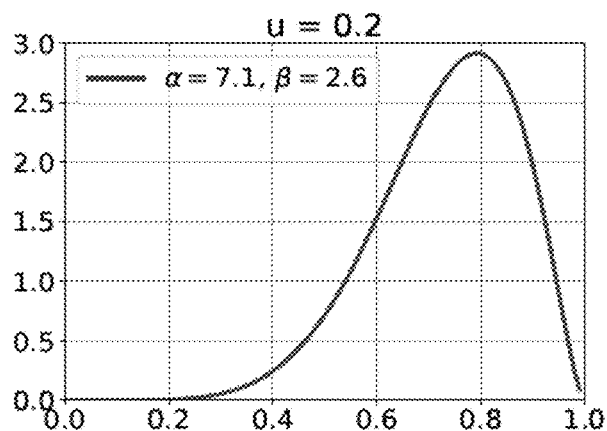
Figure 2C:
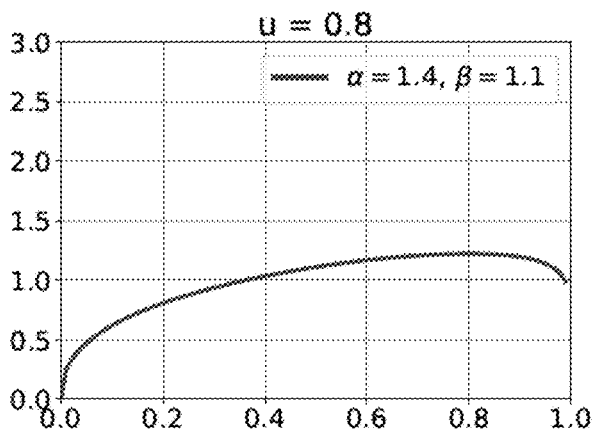

Three example probability density functions of the beta distribution parameters $\alpha$ and $\beta$ are shown in FIGS. 2a-2c. The plots show the evidence and belief masses generated from three different example images applied to a machine learned classifier. In FIG. 2a, the value of $\alpha$ is low (=1.6) and the value of $\beta$ is high (=5). This means that the negative label (e.g. healthy anatomy or no anomaly present in the image) is more likely than the positive label for the input image. The machine learned classifier may output the most probable label. Because the overall amount of evidence is high, the uncertainty is low (=0.3). In FIG. 2b, the value of $\alpha$ is high (=7.1) and the value of $\beta$ is low (=2.6). This means that the positive label (e.g. diseased anatomy or an anomaly present in the image) is more likely than the negative label for the input image. Like in FIG. 2a, because the overall amount of evidence is high in FIG. 2b, the uncertainty is low (=0.2). In FIG. 2c, the evidence is spread between the positive and negative labels, as can be seen by the more horizontal line in the graph (e.g. as compared to the peaks shown in FIGS. 2a and 2b). The value of $\alpha$ and the value of $\beta$ are about the same (=1.4 and =1.1, respectively), meaning that the evidence present in the input image supports both labels. Though the classifier might apply the more probable label ($\alpha$) to the input image, the classification has a high uncertainty (=0.8). Though the labels in FIGS. 2a and 2b has high confidence, high uncertainty in a classification, as in FIG. 2c, is a situation where the input image may need further review, for example, by a professional interpreter.

The probability of each label may be derived from the evidence values.

$$p^+ = \frac{\alpha}{E}, \text{ and} \quad \text{Eqn. 10}$$

$$p^- = \frac{\beta}{E} \quad \text{Eqn. 11}$$

In equations 10 and 11, $p^+$ represents the probability for the positive label and $p^-$ represents the probability for the negative label.

In act 107, a label of the medical image and a measure of uncertainty for the label are generated for the medical image applied to the machine learned classifier. In the binary example above, the label may be the classification of the image as containing or not containing an anatomic anomaly or abnormality. The label may be the most probable of the plurality of labels. In some cases, the label may be the classification of the image as containing or not containing a lesion or other abnormal anatomy. The uncertainty may be determined based on the belief masses. For example, the measure of uncertainty may be generated using equation 1.

In act 109, the measure of uncertainty may be compared to a threshold level of uncertainty. Because the uncertainty may range from 0 to 1 in some cases, the threshold may lie in that range. The threshold may be predefined. For example, the threshold may be chosen by an operator to optimize the speed or accuracy of the classification, or to minimize the number of images referred for manual review. Other considerations may affect the choice of threshold. In some cases, the threshold may be chosen or set as 0.5. An uncertainty measure beyond the threshold may indicate an uncertain label for an image. Such an image may be suitable for additional review, for example, in act 111. An uncertainty measure within the threshold may indicate a sufficiently confident label which may not require further review. For example, images with confident labels may be output in act 115.

In some cases, the uncertainty may be compared to an uncertainty criterion or criteria. For example, the criteria may specify a maximum, minimum, or range of acceptable values of uncertainty. When the uncertainty is within the range, below the maximum, or greater than the minimum, the uncertainty may meet the criterion or criteria. When the uncertainty is outside of the range, greater than the maximum, or lower than the minimum, the uncertainty may not meet the criterion or criteria. The value or values of the criterion or criteria may be chosen as discussed above for the uncertainty threshold. Images having uncertainty that does not meet the uncertainty criteria may be referred.

In act 111, the medical image may be referred for additional evaluation. The image may be referred when the uncertainty exceeds the threshold. In some cases, an additional label may be applied to images with labels having uncertainty beyond the threshold. For example, such images may be labeled as "uncertain." The referral may include displaying the image on a display. A reviewer or interpreter may evaluate the medical image and determine the correct label. In this way, the machine learned classifier may label the medical images where it can predict the label with high confidence and refer only the images with low confidence (e.g. high uncertainty) for manual review, thereby making classification quicker, more accurate, and more efficient.

In act 113, the label is removed. The label may be removed when the uncertainty is high because there is a higher likelihood of the label being incorrect. Additional review, for example by a trained interpreter, may be necessary to determine the correct label.

In act 115, the medical image is output. The medical image may be output with the label and/or the measure of uncertainty. The medical image, the label, and/or the uncertainty may be output to a display. For example, the display 911 of FIG. 9 may display the medical image, the label, and/or the measure of uncertainty.

Figure 3:
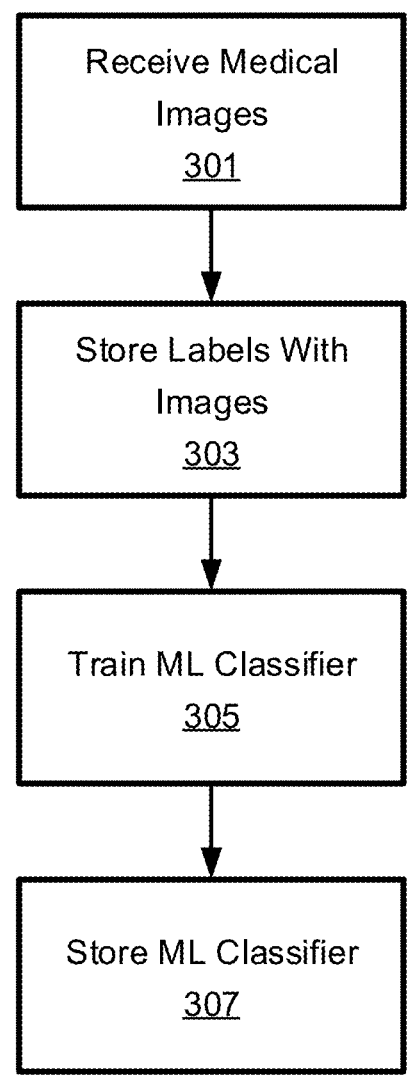
FIG. 3 illustrates an embodiment of a method for training a deep learning network to classify medical images.

FIG. 3 illustrates an embodiment of a method for training a deep learning network to classify medical images. More, fewer, or different acts may be performed. In some cases, act 303 may be omitted. The acts may be performed in a different order than shown. In some cases, other acts may precede or proceed from the acts of FIG. 3. For example, one or more acts of FIG. 1 may proceed from act 307 of FIG. 3 or another act. A processor coupled to a memory may be configured to perform one or more of the acts. For example, the processor 903 of FIG. 9 may be configured to perform one or more of the acts of FIG. 3.

In act 301, medical image data is received. The medical image data may be received from a medical imaging device or from a data store, such as a server. In some cases, the medical image data may be a training set of medical image data. Examples of training sets of medical image data are PLCO and ChestX-Ray8. The medical image data may be medical images obtained via MR, CT, x-ray, or another imaging modality.

In act 303, labels associated with the medical image data are stored. In some cases, the medical image data may be annotated with a label or classification. Each medical image may have a label. The label may indicate whether the anatomy represented in the medical image contains an abnormality or is healthy. In some cases, the labels may be included with the received medical image data. In some other cases, labels may be added to the medical image data. The labels may be added by a human or another machine interpreter.

In act 305, a machine learning network may be trained using machine learning. The medical images and associated labels may be applied to the machine learning network. The machine learning network may be a deep learning network, such as a neural network. The medical image data and labels may be represented as a training dataset D composed of N pairs of images, $I_k$ with class assignment $y_k$.

$$D=\{I_k, y_k\}_{k=1}^N \qquad \text{Eqn. 12}$$

$$y_k \in \{0,1\} \qquad \text{Eqn. 13}$$

To estimate the per-class evidence values from the observed data (e.g. the evidence found by the network in the input medical image), the deep neural network may be parameterized by $\theta$ and the medical images applied to the network.

$$[e_k^+, e_k^+] = R(I_k; \theta) \qquad \text{Eqn. 14}$$

In Equation 14, R denotes the network response function. Using maximum likelihood estimation, the network parameters $\theta$ by optimizing a Bayes risk with a beta distributed prior.

$$L_k^{data} = \int \|y_k - p_k\|^2 \frac{\Gamma(\alpha+\beta)}{\Gamma(\alpha)\Gamma(\beta)} p_k^{\alpha-1}(1-p_k)^{\beta-1} dp_k, \qquad \text{Eqn. 15}$$

$$\text{where } k \in \{1, \ldots, N\} \qquad \text{Eqn. 16}$$

In Equations 15 and 16, k denotes the index of the medical image from the training dataset D of medical images, $p_k$ denotes the predicted probability on the medical image k, and $L_k^{data}$ defines the goodness of the fit (e.g. as part of a loss function). Using linearity properties of the expected value of L, Equation 15 may be rewritten as follows.

$$L_k^{data} = \int (y_k - \hat{p}_k^+)^2 + (1 - y_k - \hat{p}_k^-)^2 + \frac{\hat{p}_k^+(1-\hat{p}_k^+) + \hat{p}_k^-(1-\hat{p}_k^-)}{E_k+1} \qquad \text{Eqn. 17}$$

In Equation 17, $\hat{p}_k^+$ and $\hat{p}_k^-$ represent the probabilistic prediction of the machine learning network and $E_k$ represents the evidence found in the image. The first two terms of Equation 17 measure the goodness of the fit, and the last term encodes the variance of the prediction. To ensure a high uncertainty value for data samples for which the gathered evidence is not conclusive for an accurate classification, an additional regularization term, $L^{Reg}$, may be added to the loss, L. Using information theory, this term may be defined as the relative entropy (e.g. the Kullback-Leibler divergence) between the beta distributed prior term and the beta distribution with total uncertainty. In this way, cost deviations from the total uncertainty state (e.g. where u=1) that do not contribute to the data fit are accounted for. With the additional term, the total cost becomes as follows.

$$L = \Sigma_{k=1}^N L_k, \text{ with} \qquad \text{Eqn. 18}$$

$$L = L_k^{data} + \lambda KL(f(\hat{p}_k; \tilde{\alpha}_k, \tilde{\beta}_k) \| f(\hat{p}_k; \langle 1,1 \rangle)), \qquad \text{Eqn. 19}$$

$$\text{where } \lambda \in [0,1], \hat{p}_k = \hat{p}_k^+, \text{ with} \qquad \text{Eqn. 20}$$

$$(\tilde{\alpha}_k, \tilde{\beta}_k) = (1, \beta_k) \text{ for } y_k = 0 \text{ and} \qquad \text{Eqn. 21}$$

$$(\tilde{\alpha}_k, \tilde{\beta}_k) = (\alpha_k, 1) \text{ for } y_k = 1 \qquad \text{Eqn. 22}$$

By removing additive constants from Equations 18-22, the regularization term may be simplified as follows.

$$L_k^{reg} = \log \frac{\Gamma(\tilde{\alpha}_k + \tilde{\beta}_k)}{\Gamma(\tilde{\alpha}_k)\Gamma(\tilde{\beta}_k)} + \sum_{x \in \{\tilde{\alpha}_k, \tilde{\beta}_k\}} (x-1)(\psi(x) - \psi(\tilde{\alpha}_k + \tilde{\beta}_k)) \qquad \text{Eqn. 23}$$

In Equation 23, $\psi$ denotes the digamma function. The total loss L, including the loss $L^{data}$ and $L^{reg}$, may be optimized on the training set of medical images using stochastic gradient descent, for example.

To improve the stability of the training, an adequate sampling of the data distribution of the medical images may be performed. The adequate sampling may also allow the machine learning network to more robustly learn to estimate the evidence values. Dropout may be applied during training to ensure an adequate sampling. For example, different neurons in the machine learning network may be deactivated randomly, thereby emulating an ensemble model. Additionally or alternatively, an explicit ensemble of multiple independently trained machine learning networks may be used for sampling.

Label noise may be present in the training dataset. Label noise refers to when the label applied to a medical image of the dataset does not match the true classification of the medical image. For example, a medical image showing normal anatomy may erroneously be classified as showing an abnormality. Label noise may be introduced by the annotator (e.g. a human or machine) incorrectly labeling the medical image. For example, a human annotator may confuse the labels, misunderstand what is present in the medical image, or lack focus when annotating and erroneously label medical images. Additionally or alternatively, label noise may be introduced by the annotation process. For example, the process of extracting labels from radiological reports (e.g. by natural language processing) may include an incorrect label form the report. To improve label noise, the training dataset may be filtered. A fraction of the training samples (e.g. medical images) having the highest uncertainty (e.g. as predicted by the system introduced herein) may be eliminated from the training set. The machine learning network may be retrained on the medical images remaining in the training set. Alternatively, instead of filtering or removing images from the training set, robust M-estimators may be applied to the machine learning model. The M-estimators may be applied with a per-sample weight that is inversely proportional to the predicted uncertainty. For example, the machine learning classifier may be trained on the training set of medical images and may give each image an uncertainty score. The machine learning classifier may be retrained on the set of training images where each image is weighted inversely with the uncertainty, so that more uncertain images have a lesser impact on the learning of the machine learning classifier than less uncertain images. In both cases, by focusing the training on more confident labels and medical images of the training set, the robustness of the machine learned classifier may be increased, thereby improving classification performance (e.g. accuracy) on unseen medical images. Unseen medical images may refer to those images not used to train the machine learning classifier.

A result of the training is a machine learned classifier. The machine learned classifier may accept as input a medical image and output a classification label of the image along with a measure of uncertainty of the label. In some cases, the machine learned classifier may generate and/or output one or more belief masses for the label. The measure of uncertainty may be based on the one or more belief masses.

In act 307, the machine learned classifier is stored. The machine learned classifier may be stored for later retrieval for classification of an image of a given patient. The machine learned classifier may be stored in a memory. For example, the machine learned classifier may be stored in the memory 905 of FIG. 9.

Once trained, further medical images (e.g. "unseen" medical images not part of the training set) may be applied to the machine learned classifier. Based on the applying, the machine learned classifier may output a label and a measure of uncertainty based on the medical image. The further medical images may be classified according to one or more of the acts of FIG. 1. For example, a machine learning classifier trained according to FIG. 3 may be the machine learned classifier of FIG. 1 (e.g. acts 103, 105, 107, or other acts).

Figure 4:
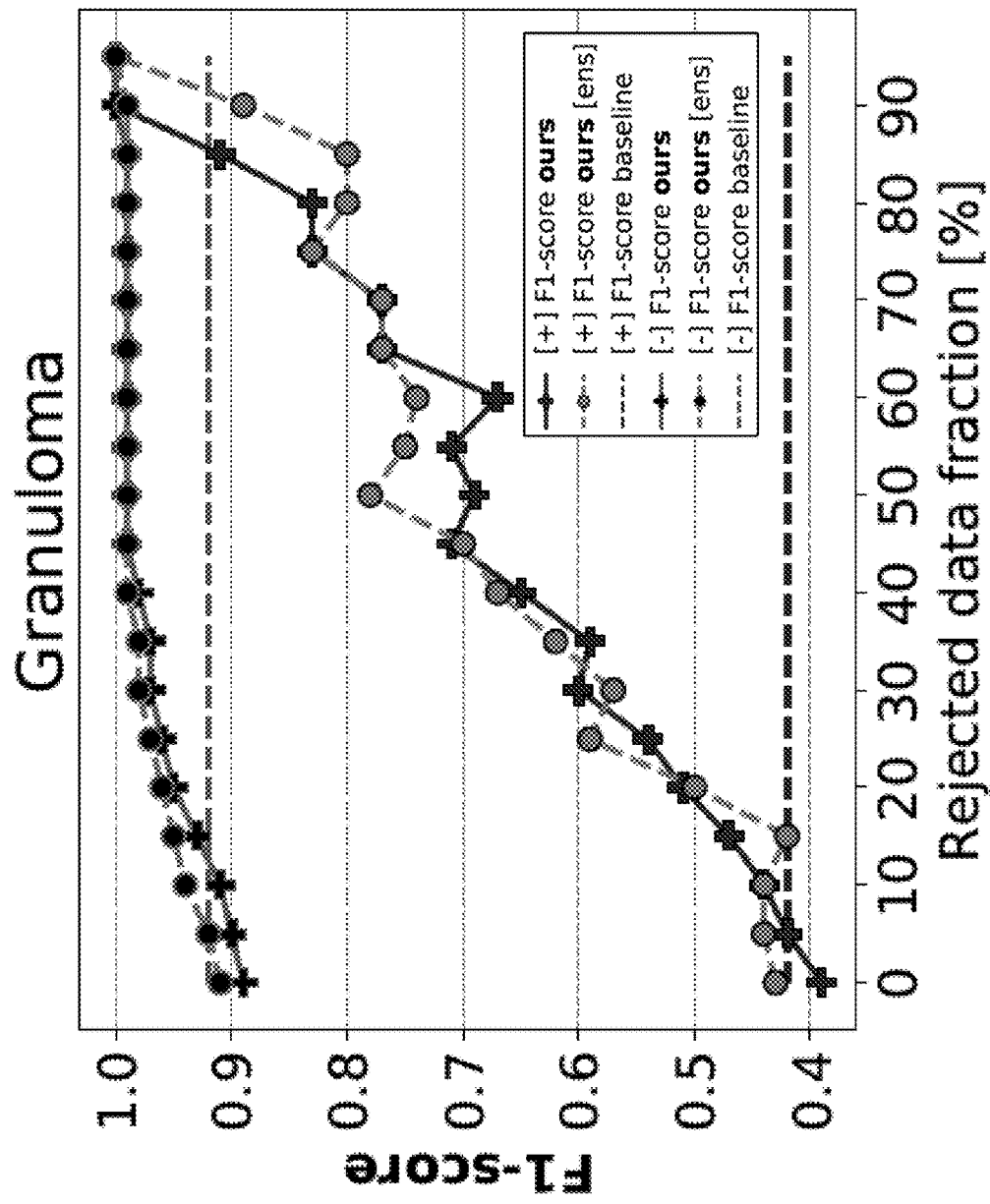
FIG. 4 illustrates an evolution of classification accuracy for Granuloma as different fractions of test cases with high predictive uncertainty are rejected.

FIG. 4 illustrates an evolution of classification accuracy for Granuloma as different fractions of test cases with high predictive uncertainty are rejected. To train a machine learning network to classify Granuloma, a subset of the PLCO and ChestX-Ray8 image sets may be randomly selected. A machine learning network may be trained (e.g. using the method of FIG. 3) on 90% of the images, with 10% used for validation of training. Other ratios for validation may be used. The machine learning network may be created based on the Densenet 121 architecture with a dropout layer having a dropout rate of 0.5 inserted after the last convolutional layer. Other neural network architectures may be used. In the machine learning network, a fully connected layer with ReLU activation units mapped to the two outputs, $\alpha$ and $\beta$. A systemic grid search may be used to find the optimal configuration of training parameters: learning rate ($10^{-4}$), regularization factor ($\lambda=1$; decayed to 0:1 and 0:001 after ⅓, respectively ⅔ of the epochs), training epochs (around 12, using an early stop strategy with a patience of 3 epochs) and a batch size of 128. Because the training image data contains many images (hundreds), a low number of epochs may be used.

The machine learned classifier trained above outputs a label and a measure of uncertainty for a given input image. The measure of uncertainty may be compared to a threshold. Where the uncertainty for an image is within the threshold, the image may be classified with the label, and where the uncertainty is beyond the threshold, the image may be labeled or referred for manual review.

Figure 5:
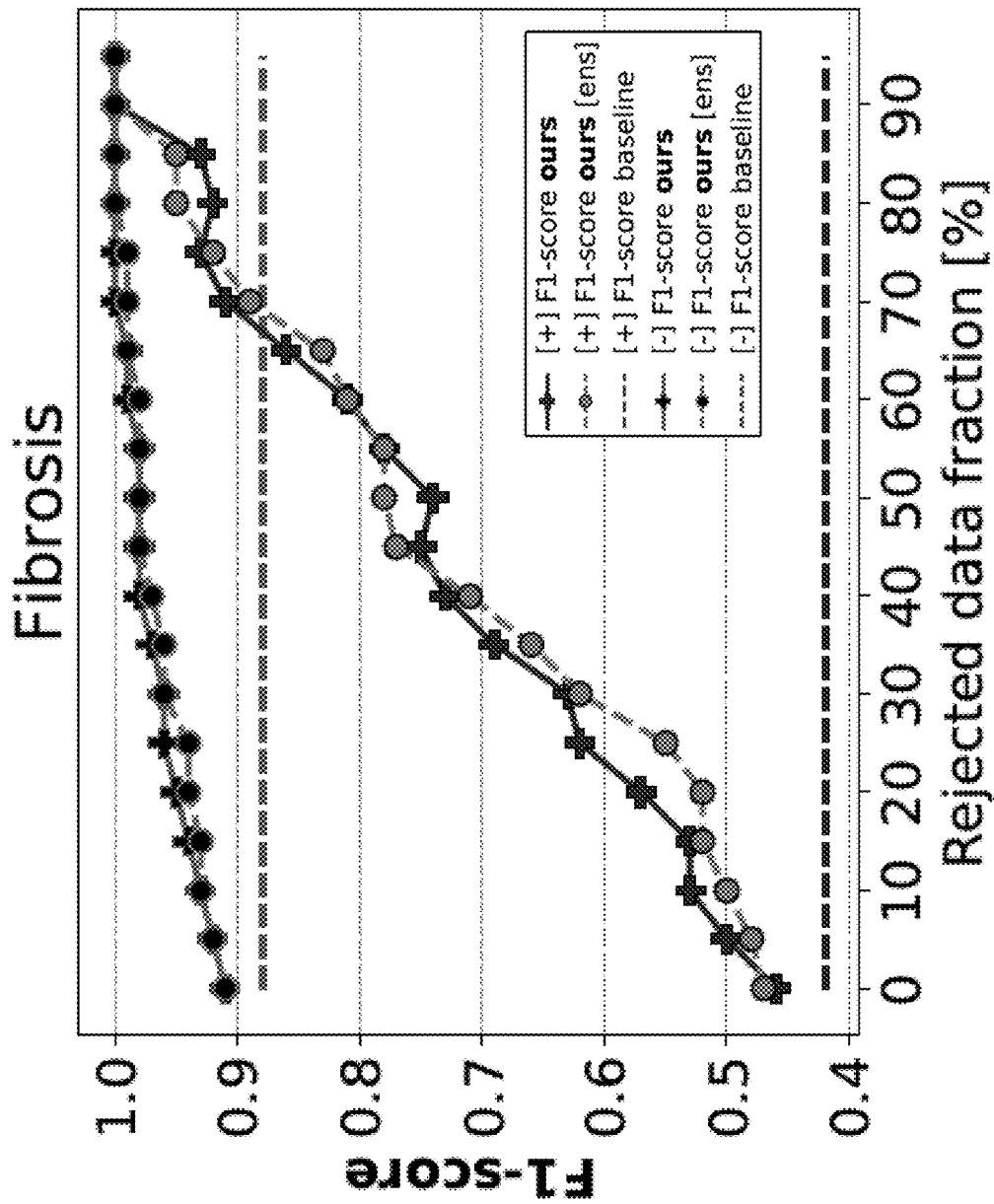
FIG. 5 illustrates an evolution of classification accuracy for Fibrosis as different fractions of test cases with high predictive uncertainty are rejected.

The plot of FIG. 4 has an x-axis showing the rejected data fraction. The rejected data fraction is the percentage of medical images referred for manual review by the machine learned classifier. Though the machine learned classifier may be trained on both the ChestX-Ray8 and the PLCO datasets and/or other datasets, the plot of FIG. 4 shows the performance of the machine learned classifier on classifying the presence or absence of Granuloma in images of the PLCO dataset. The rejected data fraction is based on the threshold uncertainty. In this way, decreasing the uncertainty threshold may increase the rejected data fraction. The y-axis of the plot shows an F1 score. The F1 score is a measure of the accuracy of the label generated by the machine learned classifier. Accordingly, the plot shows the change in the accuracy of the machine learned classifier on the cases where the label is retained (e.g. the accuracy of the label for those images having uncertainty within the threshold) as the rejected data fraction changes. Six lines are plotted: two dotted lines plotting baseline F1 scores for the positive (+) and negative (−) classifications that are determined by a working point at maximum average of per-class F1 scores, two lines plotting the F1 score of the positive (+) classification (e.g. correctly labeling presence of Granuloma), and two lines plotting the F1 score of the negative (−) classification (e.g. correctly labeling the absence of Granuloma). The baseline F1 scores are determined from choosing probability thresholds for distinguishing between positive and negative medical images (e.g. 0.1, 0.5, 0.7, or others). In FIGS. 4 and 5, the value of the working point threshold uncertainty was chosen as to maximize the average per-class F1 score. The lines labeled [ens] in the legend are the performance for a machine learned classifier using ensembles for sampling, while the lines without [ens] are the performance for a machine learned classifier using dropout. The difference in performance between dropout and ensembles is not significant. However, FIG. 4 shows improved performance over the baseline. A rejection rate of 25% lead to an increase of over 20% in the F1 score, while a 50% rejection rate lead to a F1 score over 0.99. Though the machine learning classifier may be classifying fewer images at the higher rejection rates, the classification performance on the remaining images may be significantly increased.

FIG. 5 illustrates an evolution of classification accuracy for Fibrosis as different fractions of test cases with high predictive uncertainty are rejected. A machine learning classifier may be trained as discussed above for FIG. 4, but instead for classifying the presence or absence of Fibrosis. FIG. 5 shows an insignificant performance gap between the machine learned classifiers dropout and machine learned classifiers using ensembles (labeled [ens]). Further, FIG. 5 shows a large performance increase over the dotted baseline F1 scores.

Because the PLCO and ChestX-Ray8 datasets include different disease (or abnormality or anomaly) classifications, machine learning classifiers may be trained on the datasets to identify the presence or absence of different diseases. Table 1 shows the classification performance for different findings of machine learned classifiers trained in accordance with procedures discussed above with respect to FIGS. 4 and 5. The results in the table are the area under the receiver operating characteristic curve (ROC-AUC) score for the machine learned classifiers, as compared to a baseline of a classification study by Guendel, et al. (Guendel, S., Grbic, S., Georgescu, B., Zhou, K., Ritschl, L., Meier, A., Comaniciu, D. "Learning to recognize abnormalities in chest X-rays with location-aware dense networks." arXiv 1803.04565 (2018)). The remaining columns show the classifier performance for rejection rates of 0%, 10%, 25%, and 50% and are based on analysis of images in the PLCO dataset; higher scores indicate better performance. "Lesion" refers to lesions of the bones or soft tissue and "Cardiac Ab." refers to a cardiac abnormality (e.g. cardiomegaly or an enlarged heart).

TABLE 1

| Finding | Guendel et al. | 0% Rejection | 10% Rejection | 25% Rejection | 50% Rejection |
| --- | --- | --- | --- | --- | --- |
| Granuloma | 0.83 | 0.85 | 0.87 | 0.90 | 0.92 |
| Fibrosis | 0.87 | 0.88 | 0.90 | 0.92 | 0.94 |
| Scaring | 0.82 | 0.81 | 0.84 | 0.89 | 0.93 |
| Lesion | 0.82 | 0.83 | 0.86 | 0.88 | 0.90 |
| Cardiac Ab. | 0.93 | 0.94 | 0.95 | 0.96 | 0.97 |
| Average | 0.85 | 0.86 | 0.89 | 0.91 | 0.93 |

Figure 6:
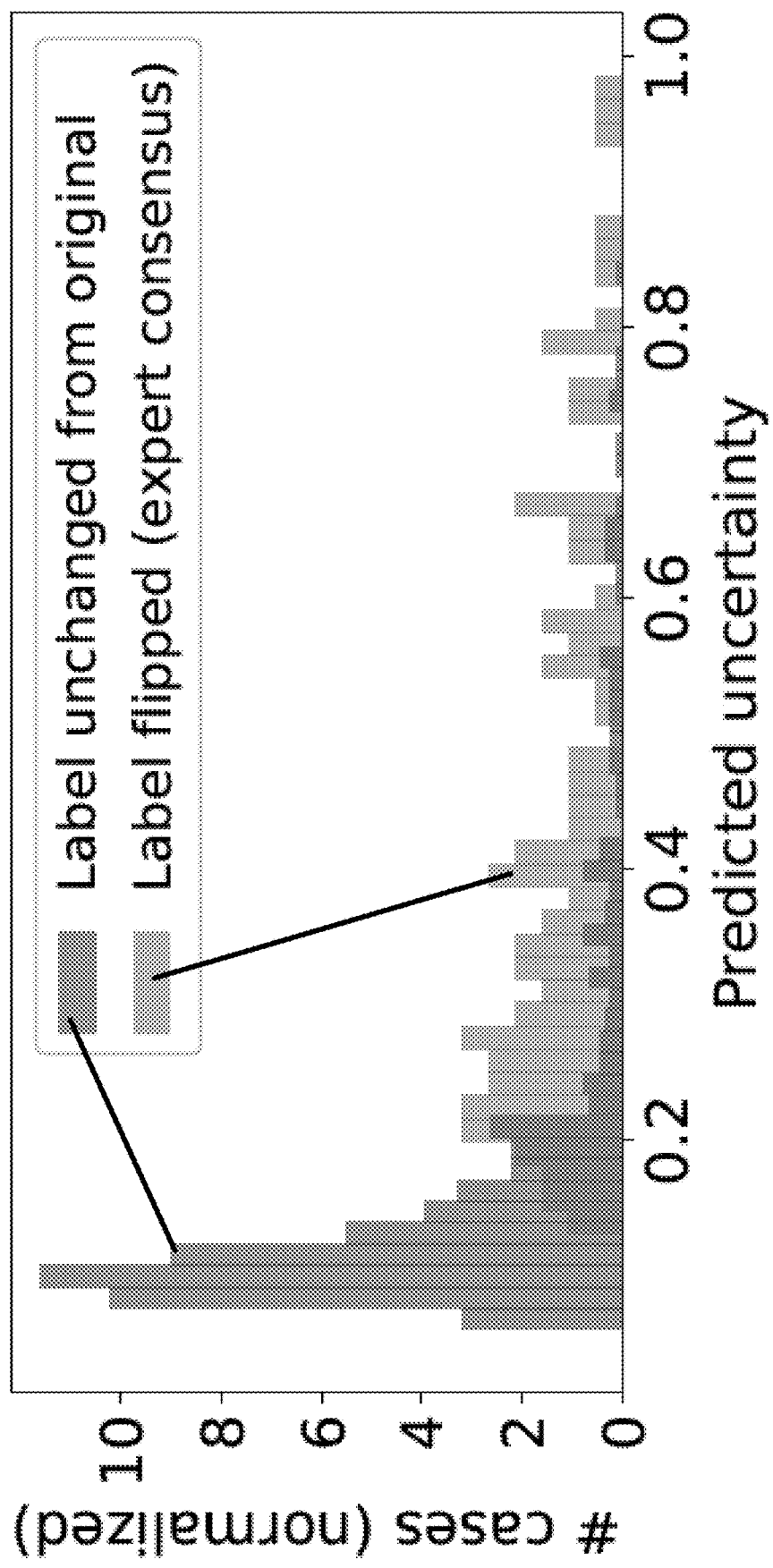
FIG. 6 illustrates a correlation between predicted uncertainty and label noise for an unseen dataset.

FIG. 6 illustrates a correlation between predicted uncertainty and label noise for an unseen dataset. A trained machine learning classifier may be used to review the labels of unseen data. For example the classifier may generate an uncertainty of a label for medical images. For example, images having an uncertainty beyond a threshold amount may be referred. By referring uncertain images, the images are presented to for review by a trained interpreter. The plot of FIG. 6 shows a histogram of the predicted uncertainty for 689 chest x-rays of the ChestX-Ray8 dataset. The x-rays in the ChestX-Ray8 dataset are assessed for pleural effusion (e.g. excess accumulation of fluid in the pleural cavity). Each of the 689 images and corresponding labels is reviewed by a committee of four expert interpreters for accuracy. The committee may change the label when the medical image was incorrectly labeled in the dataset. The labels may be incorrect in the ChestX-Ray8 dataset because the images and labels are extracted from radiological reports using a natural language processing algorithm. The underlying radiological report may include the incorrect label, or the algorithm may have extracted the wrong label. Additionally, the labels may not be reviewed for accuracy when extracted for inclusion in the dataset.

The plot shows two classes, the first class of images where the label is unchanged when reviewed by the experts, and the second class of images where the label is changed by the committee of experts. The second class, where the label is incorrect as included in the dataset, is disposed further along the x-axis, corresponding to higher uncertainty, whereas the first class has a large peak at low uncertainty. In other words, on cases which were initially labeled wrong by a human reader (e.g. according to the expert committee), the machine learned classifier outputs a generally higher uncertainty. On cases which were labeled correctly by a human reader (e.g. the expert committee left that label unchanged), the machine outputs a generally low uncertainty value This means that high predicted uncertainty as output by a trained machine learning classifier corresponds to the committee's decision to change the label for an image. For the unchanged cases, the machine learning predicts low uncertainty estimates (averaging 0.16). In this way, the uncertainty output by the machine learning classifier, because the uncertainty corresponds to incorrectly labeled medical images, may be used to identify and correct the erroneously labeled medical images.

Figure 7:
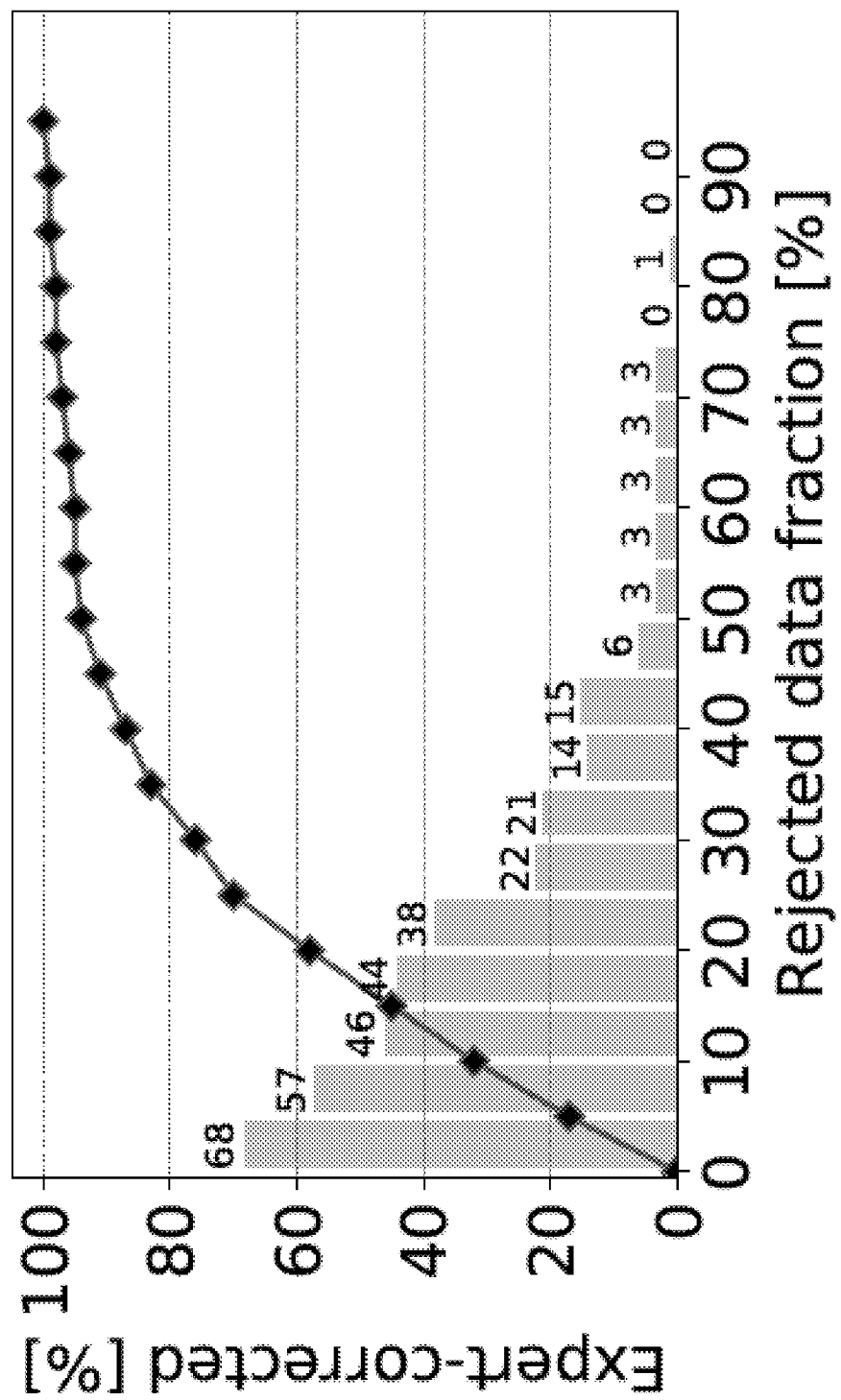
FIG. 7 illustrates a further correlation between predicted uncertainty and label noise for an unseen dataset.

FIG. 7 illustrates a further correlation between predicted uncertainty and label noise for an unseen dataset. FIG. 7 shows a plot of the percentage of labels corrected by experts in a "critical set" of medical images. FIG. 7 follows from FIG. 6: FIG. 6 shows two classes of medical images, one class where a panel of experts does not change the label annotated with the image from the training set, and another class where the experts do change the given label. FIG. 7 shows the performance of the machine learned classifier in rejecting images in the critical set—those cases that are labeled (positive or negative) incorrectly—based on the uncertainty. The critical set includes both cases where the natural language processing algorithm that generates the ChestX-Ray8 dataset incorrectly extracts the label from the radiographic report, and also difficult cases where image quality is limited or evidence of effusion subtle. A threshold uncertainty may be predetermined. The machine learned classifier may output an uncertainty for each input image and the uncertainty may be compared to the threshold. Images with more uncertainty than the threshold may be rejected from classification by the classifier.

The x-axis plots the rejected data fraction in 5% bands. The rejected data fraction is the number of images rejected due to uncertainty over a threshold versus the total number of images. In FIG. 7, and as with FIG. 6, 689 images total are evaluated. The y-axis shows the percent of the images in the critical set that are corrected by the expert panel. Bars in the field of the plot show the percentage of critical cases in the rejected cases for each 5% band. For example, for the first 5% of rejected cases (e.g. 5%×689=34 cases), 68% of the cases (about 23 cases) included an incorrect label in the ground truth according to the expert committee. The line plots the percentage of expert corrected images for each 5% band. Lower rejected data fractions (corresponding to higher uncertainty thresholds) may result in more of the rejected images being members of the critical class having incorrect labels. By rejecting the most uncertain medical images for expert review, the incorrectly labeled medical images may be quickly identified and corrected.

Figure 8A:
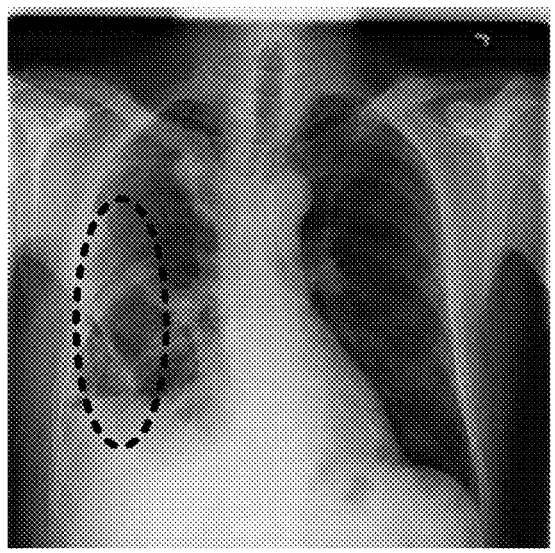
FIGS. 8a, 8b, 8c, and 8d illustrate medical images.
Figure 8B:
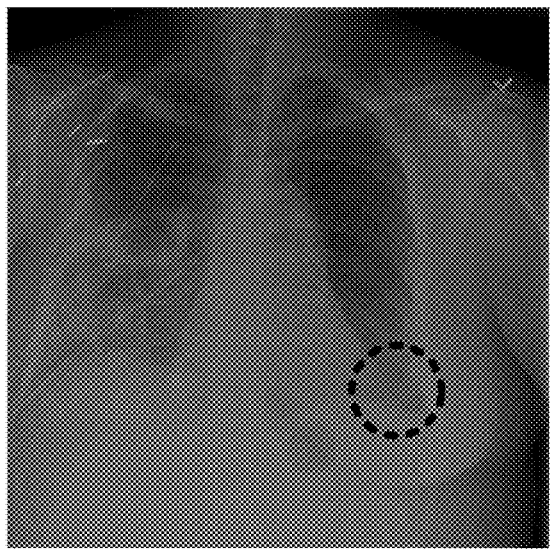
Figure 8C:
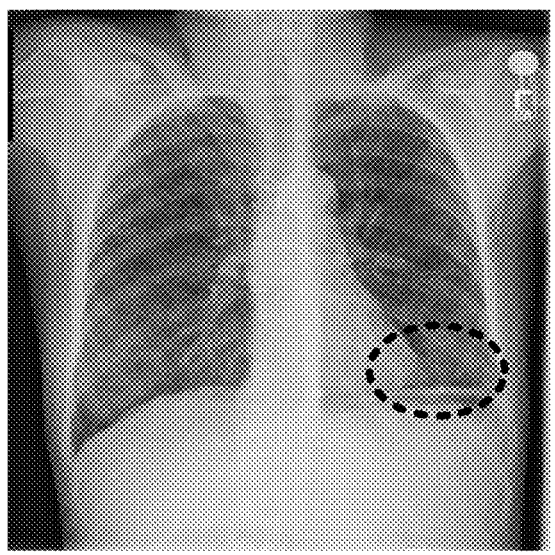
Figure 8D:
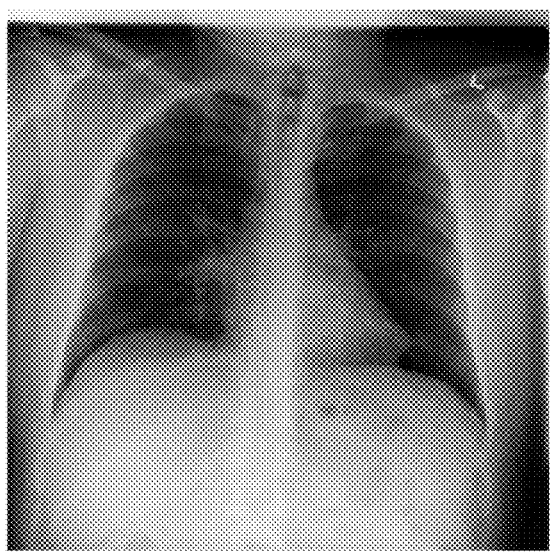

FIGS. 8 8a, 8b, 8c, and 8d illustrate medical images. The four images 8a-8d are examples from the subset of ChestX-Ray8 dataset evaluated for pleural effusion (e.g. in FIGS. 6 and 7). In FIGS. 8a-8c, the region of the chest affected by the effusion is circled. FIG. 8a-8c are positive cases of the critical set—all have high predictive uncertainty. The images may be input to a machine learned classifier and uncertainty and probability values output for the images. FIG. 8a has an estimated uncertainty of 0.90 and an output probability of 0.45, FIG. 8b has an estimated uncertainty of 0.93 and an output probability of 0.48, FIG. 8c has an estimated uncertainty of 0.54 and an output probability of 0.65, and FIG. 8d has an estimated uncertainty of 0.11 and an output probability of 0.05. In FIG. 8a, the accumulated fluid is atypical in appearance. The unusual presentation of the effusion may represent a challenge to a machine learned classifier and contribute to the high uncertainty value. In FIG. 8b, the image quality is low, which may contribute to the high uncertainty value. In FIG. 8d, the image clearly does not show effusion and the machine learned classifier has output with high confidence that no effusion is present.

Figure 9:
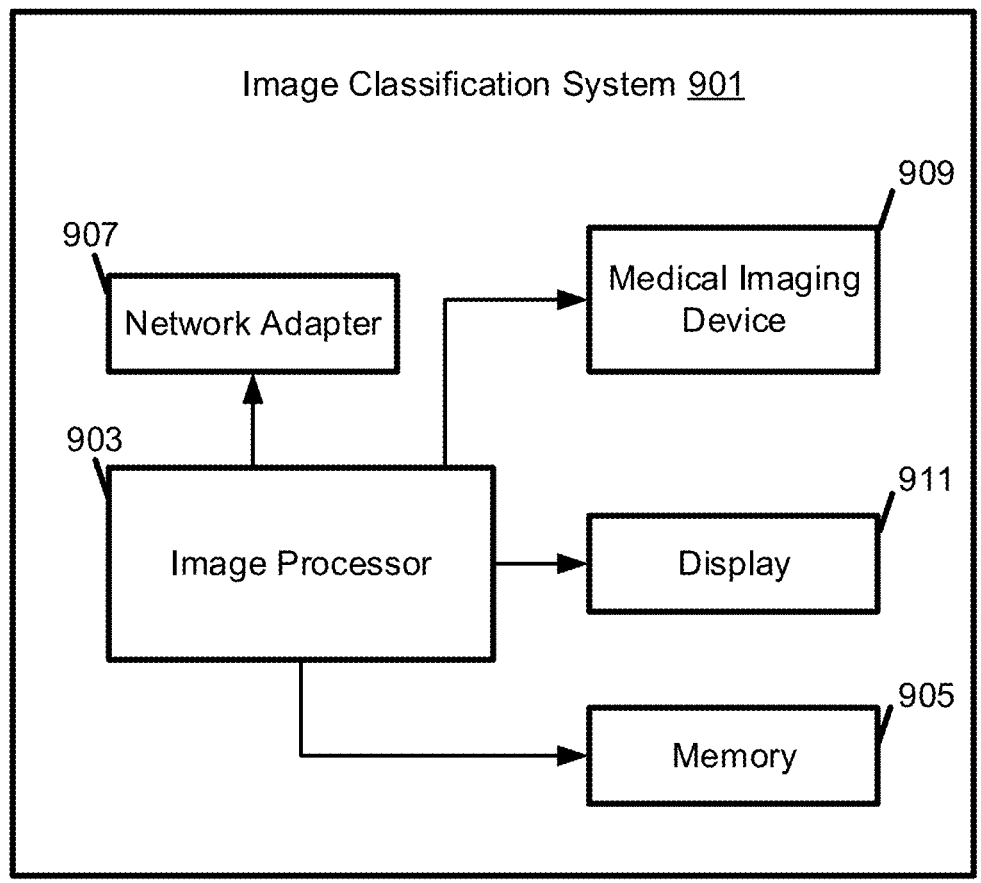
FIG. 9 is a block diagram of one embodiment of a system for generating code for classifying medical images.

FIG. 9 is a block diagram of one embodiment of a system for classifying medical images. The classification system 901 may include an image processor 903 coupled with a memory 905 and in communication with a network adapter 907, a medical imaging device 909, and a display 911.

The image classification system 901, including one or more components 903-911 of the image classification system 901, may be configured to perform one or more of the acts of FIG. 1, FIG. 3, or other acts. The image classification system 901 may be implemented in one or many different forms. For example, the image classification system 901 may be implemented as a desktop computer program, a server-based computer program, a mobile application, a cloud-based service, or otherwise.

The image processor 903 may be a general purpose or application specific image processor. The image processor 903 may be configured to or may execute instructions that cause the image processor 903 to receive a first medical image. The processor may receive the medical image via the network adapter 907, from the memory 905, from the medical imaging device 909, or from another device. The medical image may be generated by a medical imaging system or device. For example, the medical imaging device 909 or another medical imaging device or system may generate the medical image. The processor 903 may be further configured to apply the medical image to a machine learned classifier. The machine learned classifier may be stored in the memory 905. In some cases, the machine learned classifier may be received at the processor 903 via the network adapter 907. The machine learned classifier may be trained on a set of medical images having associated labels. In some cases, the image processor 903 may be configured to train the machine learning classifier. For example, the image processor 903 may be configured to train the classifier according to FIG. 3. The image processor 903 may be further configured to generate a label and a measure of uncertainty for the received medical image based on applying the medical image to the machine learned classifier. The image processor may be configured to generate one or more belief masses, and the label and measure of uncertainty may be based on the belief masses. The image processor 903 may be further configured to output the label and/or the measure of uncertainty. For example, the image processor 903 may send the label and/or the measure of uncertainty to the display 911. In another example, the image processor 903 may send the label and/or the measure of uncertainty to the memory 905 for storage. In some cases, the processor 903 may be configured to compare the uncertainty to a threshold level of uncertainty. When the uncertainty exceeds the threshold, the processor 903 may be configured to refer to medical image for additional evaluation. For example, the processor 903 may send the medical image, the label, and/or the measure of uncertainty to the display 911. An experienced reviewer may view the image, the label, and the measure of uncertainty on the display. In another example, the processor 903 may send the medical image, the label, and/or the measure of uncertainty to the memory 905 for storage and retrieval. In still another example, the image processor 903 may send the medical image, the label, and/or the measure of uncertainty to the network adapter 907. The medical image, the label, and/or the measure of uncertainty may be stored or displayed at another computer or system via the network adapter 907.

The memory 905 may be a non-transitory computer readable storage medium. The memory 905 may be configured to store instructions that cause the image processor to perform an operation. For example, the memory 905 may store instructions that, when executed by the image processor 903, cause the image processor 903 to perform one or more acts of FIG. 1, FIG. 3, or other acts. The memory 905 may be configured to store medical images, labels, belief masses, measures of uncertainty, training data, machine learning classifiers, machine learned classifiers, values of threshold uncertainty, or other information. The instructions for implementing the processes, methods, and/or techniques discussed herein are provided on non-transitory computer-readable storage media or memories, such as a cache, buffer, RAM, removable media, hard drive, or other computer readable storage media. Non-transitory computer readable storage media include various types of volatile and nonvolatile storage media.

The network adapter 907 may be a software module executed by the image processor 903. In some cases, the adapter may be implemented by a separate image processor or by standalone hardware. The adapter 907 may be configured to receive and/or transmit medical images, labels, belief masses, measures of uncertainty, training data, machine learning classifiers, machine learned classifiers, values of threshold uncertainty, or other information between components of the image classification system 901 and other components or systems. For example, the network adapter 907 may be in communication with a computer, a server, a medical imaging device, or other devices.

The medical imaging device 909 may be configured to generate medical images. The medical imaging device may use an MR, CT, x-ray, or another imaging modality to generate images. The medical imaging device 909 may be configured to send the medical images to one or more of the components of the image classification system 901. For example, the medical imaging device 909 may send the images to the processor 903, the memory 905, the network adapter 907, or the display 911 directly or through one or more intermediaries.

The display 911 may be configured to accept user input and to display audiovisual information to the user. In some cases, the display 911 may include a screen configured to present the audiovisual information. For example, the display 911 may present the medical image, the label, and/or the measure of uncertainty. Via the display 911, users may review the medical image, the label, and/or the measure of uncertainty to assess if the label is correct for the medical image. The display 911 may include a user input device. For example, the display may include a keyboard, mouse, and/or a virtual or augmented reality environment. In some cases, the user may input information relating to the uncertainty threshold or other information. In some cases, the input device 111 of FIG. 1 may be part of the display 911.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for classifying medical images, the method comprising:
    receiving, by a processor, a medical image;
    applying, by the processor, the medical image to a machine learned classifier, the machine learned classifier trained on a plurality of medical images;
    generating, by the processor, one or more belief masses representing evidence in the medical image for an overall image label in the medical image, wherein the belief masses are an output of the machine learned classifier;
    generating, by the processor, the overall image label of the medical image, a probability of the overall image label, and a measure of uncertainty of the overall image label based on the applying, the measure of uncertainty representing a confidence in the overall image label, wherein the overall image label, the probability, and the measure of uncertainty are generated based on the one or more belief masses;
    comparing, by the processor, the measure of uncertainty to a threshold level of uncertainty; and
    when the measure of uncertainty is within the threshold level of uncertainty, outputting, by the processor the medical image, the image label, or a combination thereof.

2. The method of claim 1, further comprising:
referring, by the processor, the medical image for additional evaluation when the measure of uncertainty exceeds the threshold.

3. The method of claim 2, wherein the medical image is part of a training dataset.

4. The method of claim 1, further comprising:
removing, by the processor, the overall image label when the measure of uncertainty exceeds the threshold.

5. The method of claim 1, wherein the overall image label indicates a presence or absence of an abnormality in the medical image.

6. The method of claim 5, wherein the overall image label is a binary label.

7. A method for training a machine learning classifier, the method comprising:
receiving, by a processor, medical image data;
storing, by the processor, a plurality of image labels associated with the medical image data;
training with machine-learning, by the processor, the machine learning classifier based on the medical image data and the plurality of image labels, where a result of the training is a machine-learned classifier and where an output of the machine-learned classifier is an image label, a probability of the image label, and a measure of uncertainty of the image label based on one or more belief masses representing evidence in the medical image data for the image label, wherein the belief masses are an output of the machine learned classifier, the measure of uncertainty representing a confidence in the generated image label; and
storing, by the processor, the machine-learned classifier.

8. The method of claim 7, further comprising:
applying, by the processor, further medical image data to the machine learned classifier; and
generating, by the processor, the output based on the applying,
wherein the image label and the measure of uncertainty are based on the further medical image data.

9. The method of claim 8, wherein the output of the machine learned classifier comprises one or more belief masses representing evidence for the image label in the further medical image data.

10. The method of claim 9 wherein the probability and the measure of uncertainty are based on the one or more belief masses.

11. The method of claim 8, further comprising:
referring, by the processor, the further medical image data for additional evaluation when the measure of uncertainty exceeds the threshold.

12. The method of claim 8, wherein the further medical image data is part of a training dataset of medical images.

13. The method of claim 8, further comprising:
discarding, by the processor, the image label when the measure of uncertainty exceeds the threshold.

14. An image classification system comprising:
an image processor, coupled with a memory containing instructions that, when executed, cause the image processor to:
receive an image;
apply the image to a machine learned classifier, the machine learned classifier trained on a plurality of images annotated with image labels;
generate one or more belief masses representing evidence in the image for an overall image label, wherein the one or more belief masses are an output of the machine learned classifier;
generate the overall image label based on the applying;
generate a probability of the overall image label and a measure of uncertainty of the overall image label based on the applying, the measure of uncertainty representing a confidence in the overall image label, wherein the overall image label, the probability, and the measure of uncertainty are generated based on the one or more belief masses; and
output the overall image label, the measure of uncertainty, or the overall image label and the measure of uncertainty.

15. The system of claim 14, wherein the memory contains instructions that, when executed, cause the image processor to:
compare the measure of uncertainty to a threshold criterion,
wherein the image and the overall image label are output when the measure of uncertainty meets the threshold criterion.

16. The system of claim 14, wherein the memory contains instructions that, when executed, cause the image processor to:
refer the image for additional evaluation when the measure of uncertainty does not meet the threshold criterion.

17. The system of claim 14, wherein the memory contains instructions that, when executed, cause the image processor to:
discard the overall image label when the measure of uncertainty does not meet the threshold criterion.

18. The system of claim 14, wherein the overall image label is a binary classification indicating a presence or absence of abnormal anatomy in the image.

* * * * *